(12) United States Patent
Kegel et al.

(10) Patent No.: US 11,140,107 B2
(45) Date of Patent: Oct. 5, 2021

(54) SYSTEM AND METHOD OF MANAGING ELECTRONIC MEETING INVITATIONS

(71) Applicant: ADVANCED MICRO DEVICES, INC., Santa Clara, CA (US)

(72) Inventors: Andrew G. Kegel, Redmond, WA (US); Arkaprava Basu, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 851 days.

(21) Appl. No.: 15/418,369

(22) Filed: Jan. 27, 2017

(65) Prior Publication Data
US 2018/0219816 A1     Aug. 2, 2018

(51) Int. Cl.
*G06F 15/16*     (2006.01)
*H04L 12/58*     (2006.01)
*G06Q 10/10*     (2012.01)
*G06F 15/173*    (2006.01)

(52) U.S. Cl.
CPC ........... *H04L 51/12* (2013.01); *G06Q 10/107* (2013.01); *G06Q 10/1095* (2013.01)

(58) Field of Classification Search
CPC ... H04L 51/12; G06Q 10/107; G06Q 10/1095
USPC ............................................... 709/205, 207
See application file for complete search history.

(56) References Cited

U.S. PATENT DOCUMENTS

| | | |
|---|---|---|
| 90,319,926 | 12/2009 | Chakra et al. |
| 8,150,385 B1* | 4/2012 | Majeti .................. G06Q 10/107 455/418 |
| 2002/0076015 A1* | 6/2002 | Norwitz ................. G06Q 10/10 379/93.09 |
| 2005/0076090 A1* | 4/2005 | Thuerk .................... H04L 51/12 709/207 |
| 2006/0095524 A1* | 5/2006 | Kay ...................... G06Q 10/107 709/206 |
| 2006/0200374 A1 | 9/2006 | Nelken |
| 2007/0005717 A1 | 1/2007 | LeVasseur et al. |
| 2007/0147596 A1* | 6/2007 | Moser ............... H04M 3/42195 379/207.02 |
| 2007/0203741 A1 | 8/2007 | Ordille et al. |
| 2009/0019116 A1* | 1/2009 | Niebuhr ............... G06Q 10/107 709/206 |
| 2009/0037541 A1* | 2/2009 | Wilson .................. G06Q 10/10 709/206 |
| 2009/0106367 A1* | 4/2009 | Banerjee .............. G06Q 10/107 709/206 |
| 2009/0161158 A1* | 6/2009 | Fujikawa ............... H04L 51/066 358/1.15 |
| 2011/0246580 A1* | 10/2011 | Goldman ............. G06Q 10/107 709/206 |
| 2012/0083287 A1* | 4/2012 | Casto ...................... H04W 4/14 455/456.1 |
| 2012/0191501 A1 | 7/2012 | Olliphant |

(Continued)

*Primary Examiner* — Karen C Tang

(57) ABSTRACT

Various messaging systems and methods are disclosed for meeting invitation management. In one aspect, a method of messaging is provided that includes generating a message to invite one or more invitees to a meeting. The message includes an assertion to suppress an auto-responder of the one or more invitees. The message is sent to the one or more invitees. The assertion suppresses the auto-responder of the one or more invitees.

20 Claims, 4 Drawing Sheets

(56) References Cited

U.S. PATENT DOCUMENTS

| | | | |
|---|---|---|---|
| 2013/0097269 A1* | 4/2013 | Plotkin | H04L 51/02 709/206 |
| 2013/0097270 A1 | 4/2013 | Plotkin | |
| 2014/0095629 A1 | 4/2014 | Brown et al. | |
| 2016/0014054 A1 | 1/2016 | Plotkin | |
| 2016/0285789 A1* | 9/2016 | Hurst | H04L 51/02 |
| 2017/0126591 A1* | 5/2017 | Nukala | H04L 51/02 |
| 2017/0235437 A1* | 8/2017 | Aguilar | H04W 68/00 715/811 |
| 2017/0250931 A1* | 8/2017 | Ioannou | H04L 51/02 |

* cited by examiner

SYSTEM AND METHOD OF MANAGING ELECTRONIC MEETING INVITATIONS

BACKGROUND OF THE INVENTION

Description of the Related Art

In current Microsoft Outlook®/Exchange products, a user can create a meeting and invite other attendees. The user generating the meeting invitation can elect to have each invited attendee send an attend/decline reply, or elect to not require replies by selecting a "no replies needed" option. However, when an invitee has an auto-responder ("out of office" reply) enabled, the meeting organizer will still receive a reply. For a sufficiently large meeting, some participants will be out of the office or otherwise unavailable and have their auto-responders turned on. The auto-responder sends a reply to every incoming email message to inform the sender that the invitee is out of the office. Meeting invitations are often packaged as email messages and thereby trigger the auto-responder message to be sent. This creates noise (spurious message traffic) in the email system and in the inbox of the organizer. Every time an organizer schedules a meeting with many participants, the organizer's inbox will receive some number of auto-responses that may be of little value to him or her. These auto-responses must be reviewed and deleted, usually by hand. For meetings with large numbers of attendees, there may be a large number of accept/decline messages that flood the inbox of the meeting organizer. Effort must be expended to delete these auto replies.

Experimentation has shown that the auto-responders in current email systems do not distinguish between emailed invitations and other forms of email communications. Therefore, the "no replies need" option is ignored by the attendees' email clients and the spurious auto-responder messages are sent, flooding the organizer's inbox.

The present invention is directed to overcoming or reducing the effects of one or more of the foregoing disadvantages.

SUMMARY OF THE INVENTION

In accordance with one aspect of the present invention, a method of messaging is provided that includes generating a message to invite one or more invitees to a meeting. The message includes an assertion to suppress an auto-responder of the one or more invitees. The message is sent to the one or more invitees. The assertion suppresses the auto-responder of the one or more invitees.

In accordance with another aspect of the present invention, a non-transient computer readable medium that has computer readable instructions for performing a method is provided. The method includes generating a message to invite one or more invitees to a meeting. The message includes an assertion to suppress an auto-responder of the one or more invitees. The message is sent to the one or more invitees. The assertion suppresses the auto-responder of the one or more invitees.

In accordance with another aspect of the present invention, a computer is provided that includes a non-transient computer readable medium that has computer readable instructions for generating a message to invite one or more invitees to a meeting. The message includes an assertion to suppress an auto-responder of the one or more invitees. The message is sent to the one or more invitees. The assertion suppresses the auto-responder of the one or more invitees.

In accordance with another aspect of the present invention, a messaging system is provided that includes an originator computer that has a non-transient computer readable medium with computer readable instructions for generating and sending a message. One or more recipient computers are networked to the originator computer. The one or more recipient computers include an auto-responder operable to automatically respond to messages. The message is an invitation to a meeting. The message includes an assertion to suppress the auto-responders of the one or more recipient computers.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Various methods of messaging using email messages or otherwise to generate and send meeting invitations are disclosed. The computers and email clients of meeting invitees typically include an auto-responder function. A generated meeting invitation includes an assertion to suppress the auto-responders of the invitee computers and email clients. In this way a meeting originator need not be flooded with auto replies when sending out meeting invitations to multiple users. In alternative implementations, forms of messaging other than email may be used such as instant messaging, text messaging, video or audio messaging, or others that will now occur to a person of skill. In yet other implementations, mixed messaging modalities may be used, where clients may communicate with each other using a combination of different forms of messaging. For example, some clients may communicate meeting invites using email, but receive invitation responses from responders using text messaging. In yet another example, a client may communicate with some other clients using email and yet other clients using instant messaging. Additional details will now be described.

Figure 1:
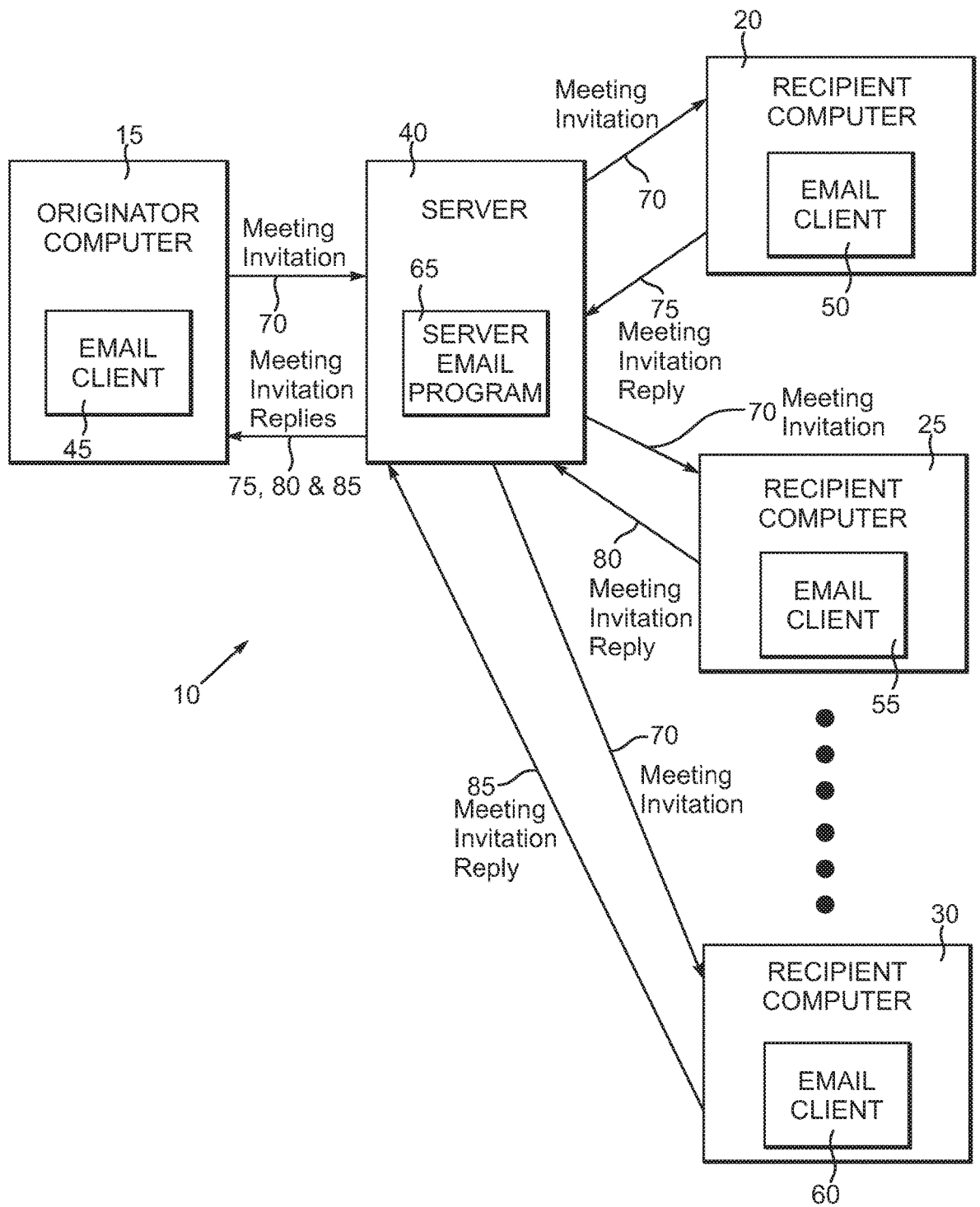
FIG. 1 is a block diagram of an exemplary embodiment of a network based meeting invitation and reply system.

In the drawings described below, reference numerals are generally repeated where identical elements appear in more than one figure. Turning now to the drawings, and in particular to FIG. 1, therein is depicted a block diagram of an exemplary embodiment of a network based meeting invitation and reply system 10 (hereinafter system 10) that may be operable to send and receive meeting invitations that are email based or not email based as desired and as described in more detail below. The basic setup depicted includes an originator computer 15, one or more recipient computers 20, 25 and 30 and a server 40, which may function as, among other things, an email server. The originator computer 15 and the recipient computers 20, 25 and 30 may be a computer, a handset or other computing device. The originator computer 15 and the recipient computers 20, 25 and 30 may include respective email clients 45, 50, 55 and 60. There are and will be numerous email clients that may be used with the originator computer 15 and the recipient computers 20, 25 and 30. Some exemplary email clients 45, 50, 55 and 60 may be a stand alone email client, such as Microsoft Outlook®, Mozilla Thunderbird®, Mac Mail, various email packages for Linux or other some other email program, or be part of a larger suite of applications. Optionally, the email clients 45, 50, 55 and 60 may be web based, such as Gmail, Yahoo mail or the like. The server 40 may include an email server program 65 that is operable to handle the flow of the meeting invitations and replies and other email functions. The server 40 may be a computer, server or other computing device. The email server program 65 may be Microsoft Outlook® Server, Mac server email or other server based email programs as desired. The originator computer 15 is operable to send meeting invitations 70 to the recipient computers 20, 25 and 30 and receive back their meeting invitation replies 75, 80 and 85, respectively. The email server 40 may be used as an intermediary to receive and transmit the meeting invitations 70 and meeting invitation replies 75, 80 and 85 and emails between the originator computer 15 and the recipient computers 20, 25 and 30. It should be understood that the server 40 could be supplanted by a peer-to-peer network of the originator computer 15 and the recipient computers 20, 25 and 30.

The email clients 45, 50, 55 and 60 and the computer readable instructions performed thereby may be stored on non-transient computer readable mediums. The computer readable mediums may be hard drives, optical drives, firmware or other storage.

It should be understood that FIG. 1 represents the status of originator versus recipient for one particular moment in time where, for example, the originator computer 15 is contemplating sending out a meeting invitation 70 to the recipient computers 20, 25 and 30. The skilled artisan will appreciate that an originator can, in one instance be a meeting invitation originator and in the next instance be a meeting invitation recipient and so on. Assume for the purposes of this discussion that the originator computer 15 is in fact in the process of originating a meeting invitation 70 to the recipient computers 20, 25 and 30. In the basic setup depicted in FIG. 1, the originator computer 15 generates a meeting invitation 70 that is broadcast to the recipient computers 20, 25 and 30 and those recipient computers 20, 25 and 30 send back meeting invitation replies 75, 80 and 85. The server 40 is operable to broadcast the meeting invitation 70 to the recipient computers 20, 25 and 30 and deliver the meeting invitation replies 75, 80 and 85 from the recipient computers 20, 25 and 30, respectively. The meeting invitation 70 may or may not make replies optional. For example, the meeting invitation 70 may include a "no reply needed" or like option for the recipients, which gives the recipient computers 20, 25 and 30 the option of replying or not to the invitation 70. The meeting invitation replies 75, 80 and 85 may be manually generated acceptances or declinations (say by the user clicking "accept" or "decline" otherwise) or an auto reply (e.g., "I am out of the office today" or "I am unavailable this afternoon") depending upon whether the recipient computers 20, 25 and 30 have their auto-responders enabled or not. However, and as described in more detail below, the system 10 is operable to enable the originator computer 15 to selectively disable the auto-responder functionality of the recipient computers 20, 25 and 30 so that the originator computer 15 is not unnecessarily flooded with auto response replies that may clutter the email inbox of the originator computer 15 inbox.

Figure 2:
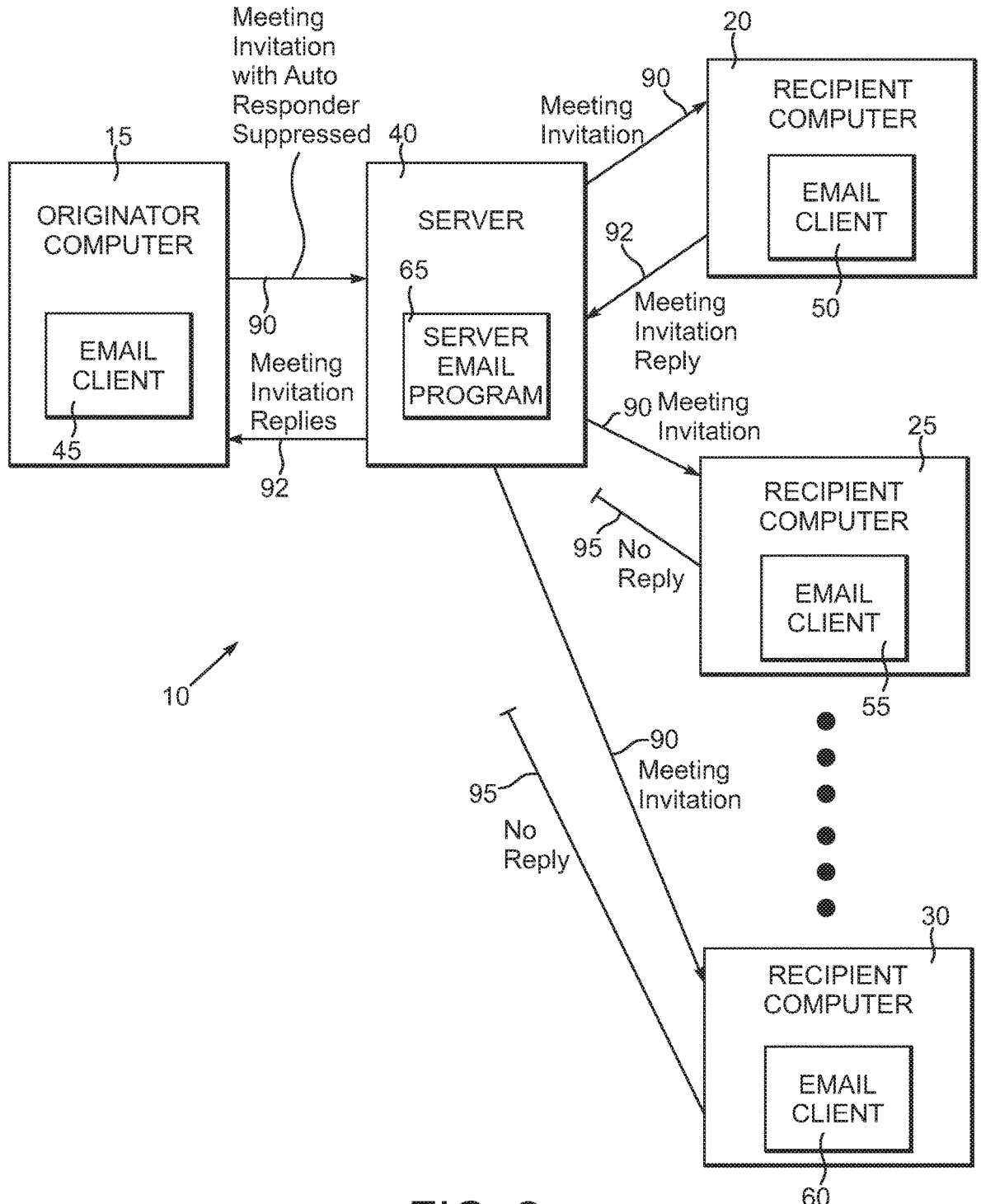
FIG. 2 is a block diagram of an exemplary embodiment of a network based meeting invitation and reply system in another operating mode.

In FIG. 2, it is assumed that the originator computer 15, by way of its email client 45 or otherwise, generates a meeting invitation with the auto-responder functionality suppressed for the recipient computers 20, 25 and 30. The meeting invitation with auto-responder suppressed 90 is a meeting invitation that includes an assertion to the recipient computers 20, 25 and 30 that no reply is needed to the invitation 90, but in addition, suppresses the auto-responder functionality of the recipient computers 20, 25 and 30 so that when a given recipient computer 20, 25 or 30 receives an instance of the meeting invitation 90 by way of the server 40 and any one of the recipient computers 20, 25 or 30 has its auto-responder enabled, that auto-responder functionality will be suppressed so that the originator computer 15 will not receive auto-responder replies from those recipient computers 20, 25 and/or 30 that have the auto-responder functionality enabled. For example, assume for the purposes of this illustration that the meeting invitation with auto-responder suppressed 90 is generated and delivered to the recipient computers 20, 25 and 30 by way of the server 40 and the server email program 65. Assume also that recipient computer 20 does not have its auto-responder enabled but the recipient computers 25 and 30 do have their respective auto-responders enabled. In this circumstance, the recipient computer 20 will receive the meeting invitation 90 with auto-responder suppressed. However, since the recipient computer 20 has its auto-responder disabled, the recipient computer 20 (via its user(s)) will either not reply or will manually generate and send to the server 40 a meeting invitation reply 92. However, recipient computer 25 does have its auto reply enabled and would ordinarily send back an auto reply (e.g., "I am out of the office") back to the originator computer 15 in response to the meeting invitation with auto-responder suppressed 90 by way of the email server 40 and so on for the recipient computer 30. However, since the meeting invitation with auto-responder suppressed 90 includes instructions to suppress the auto-responder functionality of the recipient computers 25 and 30, the recipient computers 25 and 30 will simply not generate replies (no reply 95), thus avoiding unnecessary cluttering of the inbox of the originator computer 15.

The meeting invitation with auto-responder suppressed 90 may be conveyed as an email or not. For example, if the originator computer 15 and one or more of the recipient computers 20, 25 and 30 are using Outlook® and their respective email clients 45, 50, 55 and 60 and the server email program 65 is Outlook Exchange, then the meeting invitation with auto-responder suppressed 90 may be a message but not necessarily an email. If, however, the originator computer 15 is using, for example, a Linux email package, then typically the meeting invitation with auto-responder suppressed 90 may be conveyed as an email. The same will be true for any other email systems that handle meeting invitations in this way.

The instructions that accompany the meeting invitation may take on a variety of formats and be delivered in a variety of ways. For example, the message invitation with auto-responder suppressed 90 may be in the form of a text file, represented schematically in FIG. 3, that has a header 94 that includes multiple fields that hold the pieces of information relevant for the invitation such as to, from, subject, date, disable recipient auto-responder, etc., and a message body 96. The various fields of the header 94 can include a do not reply or auto-responder suppress string that will be interpreted by the recipient computers 20, 25 and 30, by the email clients 50, 55 and 60 or otherwise to suppress the auto-responder function in the event for a meeting invitation but not necessarily for other email traffic or other messaging. The option to generate the meeting invitation with auto-responder suppressed 90 (or without such suppression) can be presented to the originator computer 15 (and its user) in a variety of ways. In an exemplary embodiment, selecting an icon or menu item in the email client 45 shown in FIG. 2, a web browser or other application, to generate a meeting invitation may cause a dialog box to appear, such as the exemplary meeting invitation dialog box 97 depicted in FIG. 4. The user can select invitees (the "To" option), dates and include the message body 98 referenced in FIG. 3 above. In addition, the dialog box 97 can include check boxes 98 and 99 to enable the user to request responses from invitees and to suppress the auto-responder of invitees. Optionally, the features of the check boxes 98 and 99 could be combined into a single option and check box. Of course, the skilled artisan will appreciate that myriad user interfaces could be used to enable the user to make the appropriate meeting invitation selections and options.

The code for the recipient computer email or message handling by way of the email clients 50, 55 and 60 or otherwise may be altered suitably in order to interpret the instruction to disable the auto-responder function for certain types of meeting invitations in a variety of ways. One example of a coding change may be as follows, where the first row shows a typical existing instruction and the second row shows the exemplary new instruction:

Typical existing instruction on (incoming(message)) if (auto_reponder==ON) send(auto_response_message);
Exemplary new instruction on (incoming(message)) if (auto_responder==ON) && (do_not_reply(message)==FALSE) send(auto_response(message);

Note that this code (instruction) can be in the email clients 50, 55 and 60, in add-ons to the email clients 50, 55 and 60, or in the email server program 65 or elsewhere in the server 40.

Figure 3:
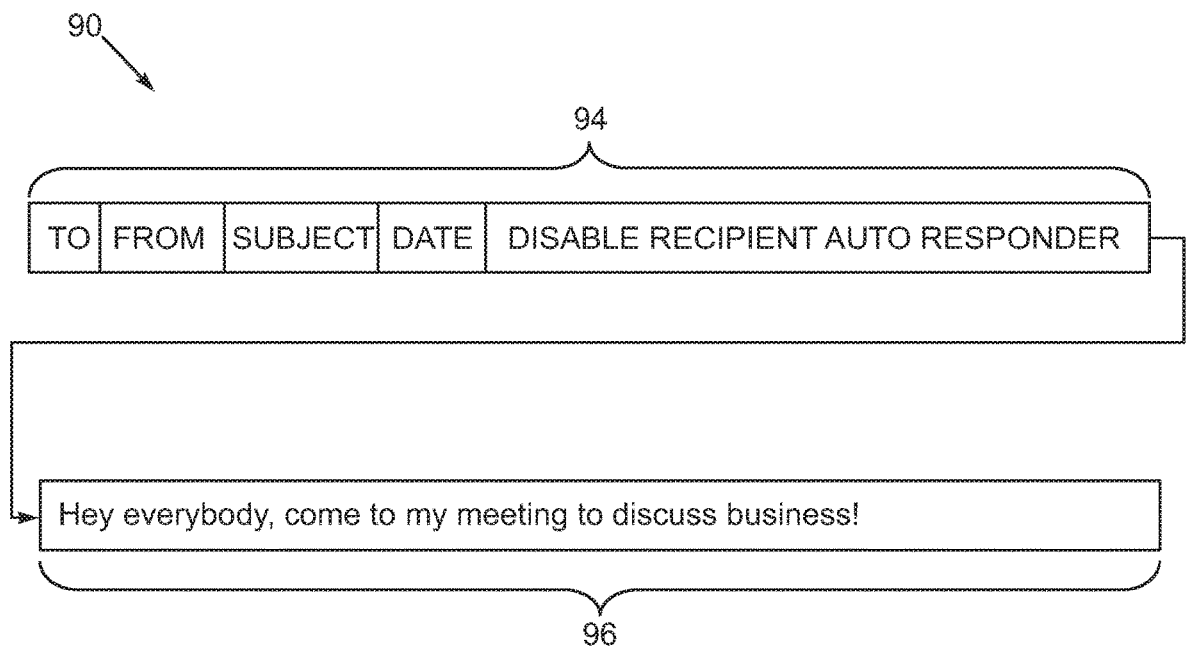
FIG. 3 is a schematic view of an exemplary message format.
Figure 4:
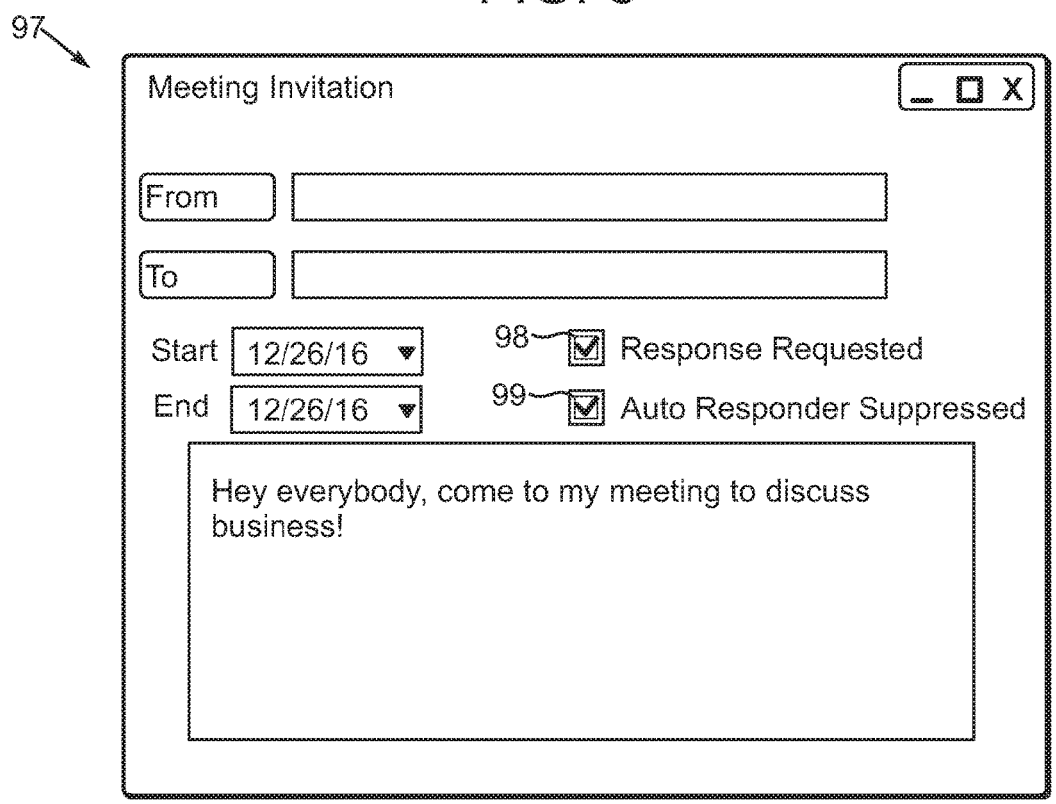
FIG. 4 is a block diagram of an exemplary message generation dialog box.
Figure 5:
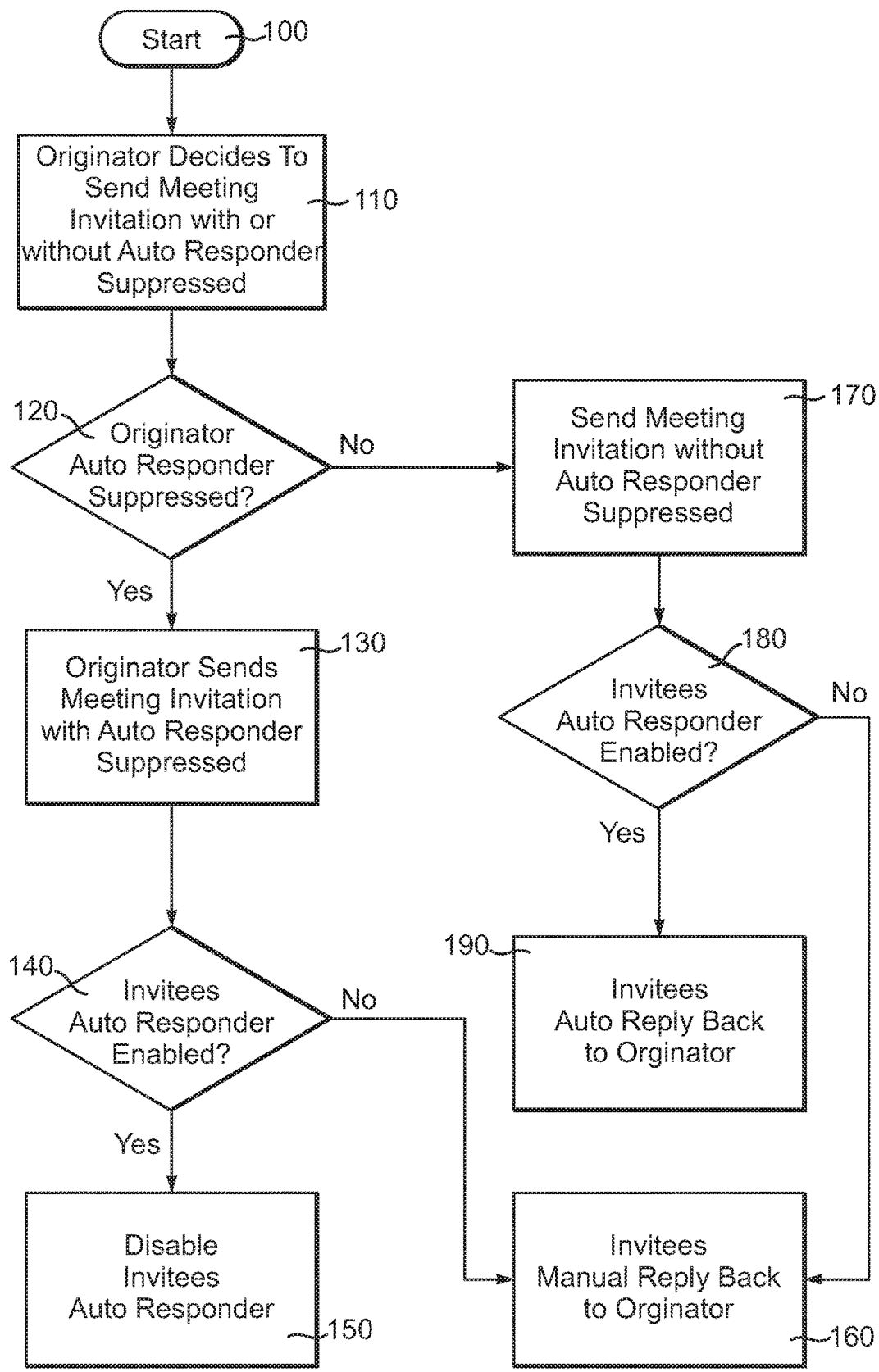
FIG. 5 is a flow chart of an exemplary method of managing meeting invitations.

An exemplary process flow for meeting invitation and response using the network 10 disclosed above may be understood by referring now to FIG. 2 and FIG. 3 which is a flow chart. After a process start at 100, at step 110 an originator (for example the originator computer 15) decides to generate a meeting invitation with or without the auto-responder function suppressed. Thus, the originator, such as the originator computer 15, may decide that for a given meeting invitation 90 the auto-responder functionality should be suppressed or not based on the desires of the originator. If at step 120 the originator has decided to generate a meeting invitation with the auto reply suppressed 90 then at step 130, the originator sends a meeting invitation with the auto-responder suppressed and this may correspond to the meeting invitation 90 with auto-responder suppressed as depicted in FIG. 2 and described above. The meeting invitation with auto-responder suppressed 90 will be responded to in two ways depending upon whether or not the invitee or recipient computer has its auto reply enabled or disabled. Thus at step 140 if the invitees (for example the recipient computers 20, 25 and 30) have their auto reply (i.e., responder) enabled then at step 150 the recipient computers or invitees in response to that meeting invitation will disable their auto replies at step 150. This corresponds to, for example, the recipient computers 30 and 35 in FIG. 2 not generating a reply (i.e., no reply 95) in response to the meeting invitation with auto-responder suppressed 90. If, however, at step 140 one or more of the invitees have their respective auto reply not enabled then at step 160 the invitees may manually reply back to the originator. If however at step 120, the originator has decided to generate the meeting invitation without the auto-responder suppressed then at step 170, the originator sends a meeting invitation without the auto reply suppressed even on this branch of the flow chart, the meeting invitation sent without auto reply suppressed at step 170 may produce two different decisions. Thus, at step 180 if the invitees have auto reply enabled then at step 190, the invitees will simply auto reply back to the originator. If however at step 180 the invitees do not have auto reply enabled then the invitees may simply manually reply back to the originator at step 160.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of messaging, comprising:
generating a message to invite one or more invitees to a meeting, the message including an assertion to suppress an auto-responder of the one or more invitees; and
sending the message to the one or more invitees, the assertion suppressing the auto-responder of the one or more invitees.

2. The method of claim 1, wherein the message comprises an email message.

3. The method of claim 1, wherein the message does not comprise an email message.

4. The method of claim 1, wherein the message is generated by an originator computer and sent to one or more recipient computers of the one or more invitees.

5. The method of claim 4, wherein the message is sent from the originator computer to a server and the server relays the message to the one or more recipient computers.

6. The method of claim 4, wherein the message is sent from the originator computer to the one or more recipient computers in a peer-to-peer network.

7. The method of claim 1, wherein the message is generated by a first email client and received by one or more other email clients.

8. The method of claim 7, wherein the first email client and the one or more other email clients comprise stand alone email clients or web-based email clients.

9. A non-transient computer readable medium having computer readable instructions for performing a method, comprising:
generating a message to invite one or more invitees to a meeting, the message including an assertion to suppress an auto-responder of the one or more invitees; and
sending the message to the one or more invitees, the assertion suppressing the auto-responder of the one or more invitees.

10. The method of claim 9, wherein the message comprises an email message.

11. The method of claim 9, wherein the message does not comprise an email message.

12. A computer, comprising:
a non-transient computer readable medium having computer readable instructions for generating a message to invite one or more invitees to a meeting, the message including an assertion to suppress an auto-responder of the one or more invitees; and sending the message to the one or more invitees, the assertion suppressing the auto-responder of the one or more invitees.

13. The computer of claim 12, wherein the message comprises an email message.

14. The computer of claim 12, wherein the message does not comprise an email message.

15. The computer of claim 12, wherein the instructions send the message from the computer to a server and the server relays the message to the one or more invitees.

16. The computer of claim 12, wherein the instructions send the message from the computer to the one or more recipient computers in a peer-to-peer network.

17. The computer of claim 12, wherein the instructions are executed by a first email client.

18. The method of claim 17, wherein the first email client comprises a stand alone email client or web-based email client.

19. A messaging system, comprising:
- an originator computer including a non-transient computer readable medium having computer readable instructions for generating and sending a message;
- one or more recipient computers networked to the originator computer, the one or more recipient computers including an auto-responder operable to automatically respond to messages; and
- whereby, the message is an invitation to a meeting, the message including an assertion to suppress the auto-responders of the one or more recipient computers.

20. The messaging system of claim 19, comprising a server connected to the originator computer and the one or more recipient computers to deliver the message to the one or more recipient computers.

* * * * *